United States Patent
Johnsson

[11] 3,900,243
[45] Aug. 19, 1975

[54] WATCHING MIRROR
[75] Inventor: Berndt-Ola Folke Johnsson, Linkoping, Sweden
[73] Assignee: Moderna Butiksinredningar AB, Molndal, Sweden
[22] Filed: June 21, 1974
[21] Appl. No.: 481,707

[30] Foreign Application Priority Data
June 25, 1973 Sweden.............................. 7308903

[52] U.S. Cl................................... 350/6; 350/299
[51] Int. Cl......................... G02b 27/17; G02b 5/08
[58] Field of Search ........... 350/6, 7, 289, 304, 285, 350/279

[56] References Cited
UNITED STATES PATENTS
| | | | |
|---|---|---|---|
| 2,718,175 | 9/1955 | Gim | 350/289 |
| 3,063,342 | 11/1962 | Zeek | 350/6 |
| 3,575,496 | 4/1971 | Pollock | 350/6 |
| 3,799,658 | 3/1974 | Pignatelli | 350/7 |

Primary Examiner—Edward S. Bauer
Assistant Examiner—Jon W. Henry
Attorney, Agent, or Firm—Newton, Hopkins & Ormsby

[57] ABSTRACT

A mirror mounted on a stand in shops, department stores and similar premises to enable supervision over areas normally hidden from the direct view of the supervisor for theft deterring purposes. The mirror is arranged to swing continuously between two extreme angular positions, so as to render an intended thief unaware of when and where he is under observation.

1 Claim, 3 Drawing Figures

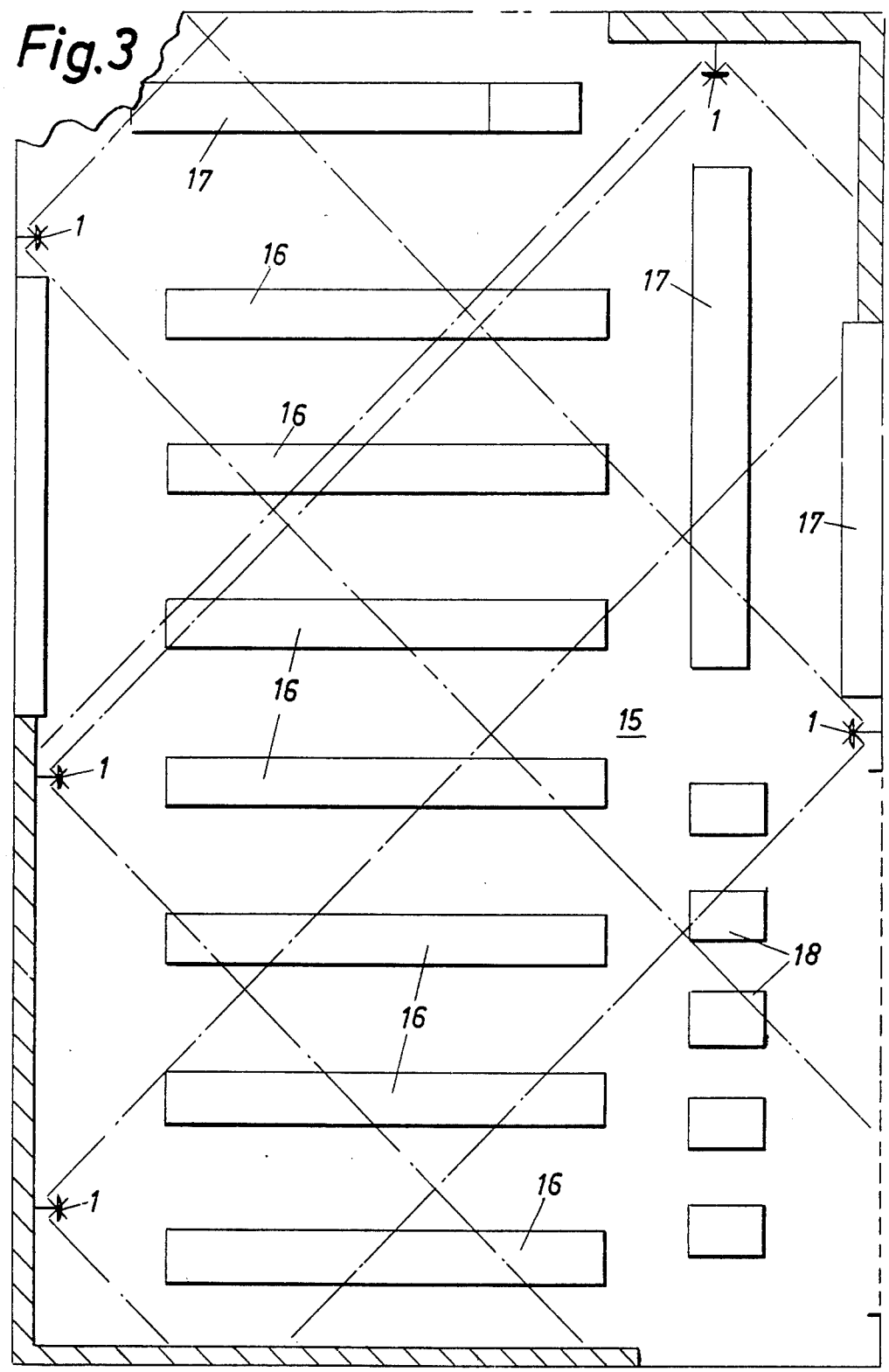

WATCHING MIRROR

BACKGROUND OF THE INVENTION

The present invention concerns a device in supervisory mirrors of the kind used in shops, supermarkets, department stores and similar premises to make it possible for an observer to gain information on the actions of persons who are hidden from his direct view or who are in positions where he can watch them only with great difficulty.

Various supervisory mirrors of this kind exist, mostly arranged in fixed angular positions at different stratetic points in the shop. The most simple kind is ordinary, flat mirrors. Because the supervisory mirror usually must be positioned at a high level in the premises to allow good visibility over the goods display stands and other areas that one wants to supervise, the field of vision becomes comparatively limited. Anyone who intends to seize an article with an intent to steal it consequently has no difficulty in finding an area wherein he or she is in a "dead" angle in relation to the observer.

This drawback has occasioned the use of convex mirrors which provide a wider field of vision. However, such mirrors also have the drawback of diminishing details reflected therein, which of course is highly unsatisfactory, particularly in mirrors to be used for supervision purposes.

SUMMARY OF THE INVENTION

The purpose of the present invention is to eliminate these drawbacks. The characteristic feature of the invention is that the mirror is arranged so as to perform swinging motions to and fro and in doing so continuously scan or sweep over a supervisional field, both to create incertainty in the person in question as to when and where he is under observation, and to expand the supervisional field.

This arrangement makes it possible to combine the advantages of flat mirrors of reflecting also small details with clarity with the broad field of vision provided by convex mirrors. When the mirror is positioned not too far away from the observer there is not, however, anything to prevent the use of a slightly convex mirror. In such cases an extremely wide supervisional field is obtained by means of the invention.

BRIEF DESCRIPTION OF THE DRAWINGS

Further advantages and characteristics will appear from the following description with reference to the accompanying drawings, wherein FIG. 3 is a plane view of a shop equipped with the device in accordance with the invention.

DETAILED DESCRIPTION OF A PREFERRED EMBODIMENT

Figure 1:
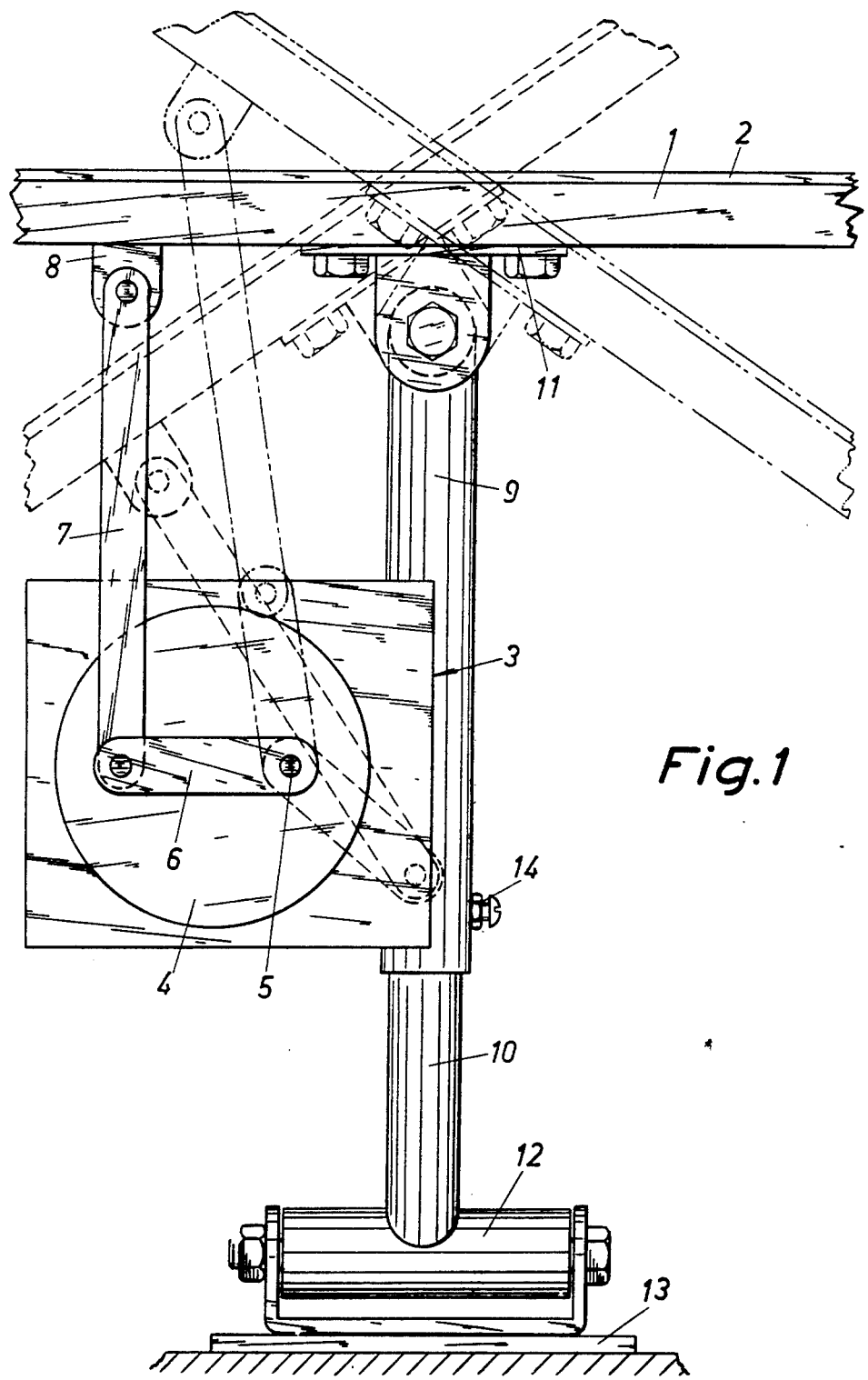
FIG. 1 is a view from above of the device in accordance with the invention.
Figure 2:
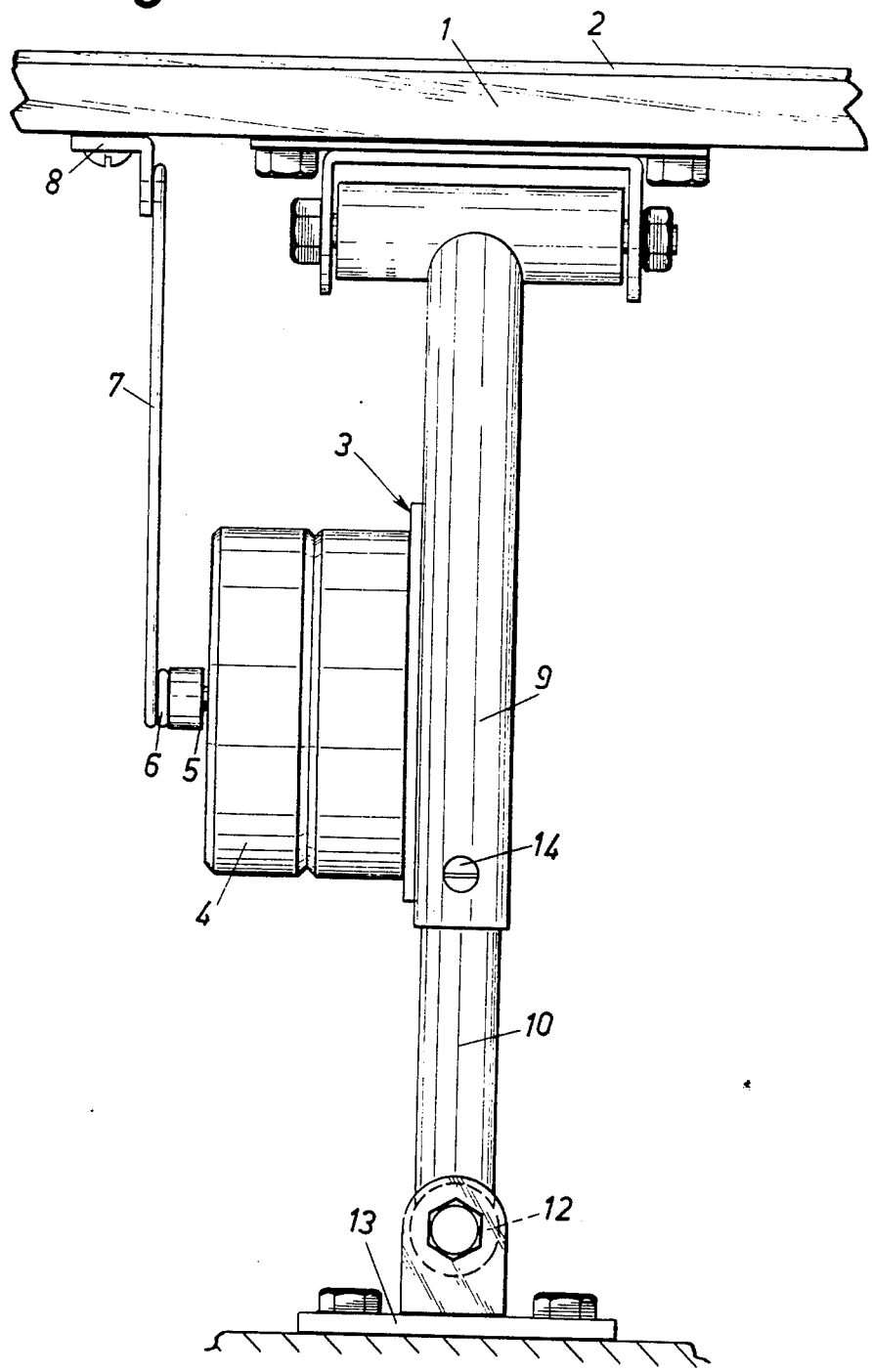
FIG. 2 is a similar view, the device having been turned over 90° relative to the position shown in FIG. 1.

The device comprises a mirror 1 which in accordance with the embodiment illustrated has a plane glass 2 and a suspension stand 3. On the stand 3 is mounted an electric motor 4. The motor drive shaft 5 supports a crank arm 6 to which one end of a link 7 is articulated. At the opposite end the link 7 is articulated to an angular plate 8 spaced somewhat from the centre of the mirror 1 and secured to the rear face of the mirror.

The suspension stand 3 also comprises a telescopically extensible arm 9, 10. Section 9 of this arm is articulated to an attachment plate 11 positioned in the centre of the mirror 1. The second arm section 10 is secured to a joint 12 on an anchoring plate 13 or the like. Section 9 on which are attached the mirror 1 and the entire turning mechanism therefor, may be turned relative to section 10 and be secured in a fixed position by means of a clamping bolt 14.

During the continuous operation of the motor 4 in one direction the crank arm 6 and the link 7 will make the mirror 1 swing to and fro between the extreme positions indicated with dash-and-dot lines in FIG. 1 and in this manner scan over a larger angular area in a manner similar to a radar screen.

As appears from FIG. 3 the device in accordance with the invention provides considerable advantages. With a comparatively small number of mirrors 1 it is possible to eliminate all "dead" angles in a shop 15 equipped with a number of goods display stands 16, refrigerating display cases 17 and the like. From the cashier's counters 18 the cashiers may directly or indirectly supervise the entire premises in spite of the numerous obstacles. In a person with the possible intention to thieve any articles the continuously moving mirrors 1 in addition create a feeling of uncertainty as to in which mirror or mirrors he or she at any one moment may be under observation. In many cases this feeling is quite sufficient to deter the person in question from the intended theft.

The invention is not limited to the embodiment as shown and described but it may be varied in many ways within the scope of the appended claims. The turning mechanism of the mirror may be formed in a different manner and the joint 12 be replaced by a ball joint. It is also possible to have the drive motor 4 generate e.g. a buzzing signal for the purpose of directly catch the attention of the shop custumers and in this manner inform them of the presence of the turning mirror.

What I claim is:

1. In building builing having a station for supervisory personnel and regions remote from said station which cannot be directly observed from said station, a plurality of mirror members positioned in the line of sight from said station, each mirror member comprising a mounting base, a mirror and means for rotatably attaching said mirror to said base for rotation about a substantially vertical axis, a drive motor and a crank arm rotatably driven thereby, and link means connecting said crank arm to said mirror in offset relation to said axis for continuously oscillating said mirror about said axis over an angular deviation sufficient to allow observation of all of said remote regions by means of said mirrors at some times, whereby a person in a remote region is uncertain when he is under observation thereby to broaden the supervisional field and deter shoplifting.

* * * * *